(12) United States Patent
Ramu (10) Patent No.: US 8,541,920 B2
(45) Date of Patent: Sep. 24, 2013

(54) HIGH DENSITY WINDINGS FOR A CONCENTRIC WOUND ELECTRICAL MACHINE STATOR

(75) Inventor: Krishnan Ramu, Blacksburg, VA (US)

(73) Assignee: Regal Beloit America, Inc., Beloit, WI (US)

( * ) Notice: Subject to any disclaimer, the term of this patent is extended or adjusted under 35 U.S.C. 154(b) by 267 days.

(21) Appl. No.: 13/074,586

(22) Filed: Mar. 29, 2011

(65) Prior Publication Data

US 2011/0234027 A1 Sep. 29, 2011

Related U.S. Application Data (60) Provisional application No. 61/318,506, filed on Mar. 29, 2010.

(51) Int. Cl.
*H02K 1/00* (2006.01)
(52) U.S. Cl.
USPC .......................................... 310/179; 310/208
(58) Field of Classification Search
USPC .................. 310/179–180, 166, 208, 214–215
See application file for complete search history.

(56) References Cited

U.S. PATENT DOCUMENTS

| | | | |
|---|---|---|---|
| 7,122,933 B2* | 10/2006 | Horst et al. | 310/216.095 |
| 7,262,538 B2* | 8/2007 | Yoneda et al. | 310/179 |
| 2002/0175586 A1* | 11/2002 | Hill | 310/179 |
| 2004/0108783 A1* | 6/2004 | Kruse | 310/179 |
| 2004/0178695 A1* | 9/2004 | Kliman et al. | 310/254 |
| 2005/0258702 A1* | 11/2005 | Michaels | 310/179 |
| 2006/0125338 A1* | 6/2006 | Groening et al. | 310/179 |
| 2007/0216244 A1* | 9/2007 | Edelson | 310/90.5 |
| 2009/0072653 A1* | 3/2009 | Harada et al. | 310/208 |

OTHER PUBLICATIONS

International Search Report and Written Opinion of the International Searching Authority dated Jun. 1, 2011.
R. Krishnan, "Switched Reluctance Motor Drives," CRC Press, pp. 1-7, 2001.

* cited by examiner

*Primary Examiner* — Thanh Lam
(74) *Attorney, Agent, or Firm* — NSIP Law (57) ABSTRACT

A switched reluctance motor includes at least four stator poles and an electrically conductive material around each of the stator poles. The geometric outline, on one side of the stator pole, of at least one of the conductive materials is not rectangular, as viewed from a cross-section of the switched reluctance motor showing each of the stator poles.

2 Claims, 7 Drawing Sheets

HIGH DENSITY WINDINGS FOR A CONCENTRIC WOUND ELECTRICAL MACHINE STATOR

This application claims priority to U.S. provisional application 61/318,506 filed Mar. 29, 2010, the content of which is incorporated herein by reference.

FIELD OF THE INVENTION

The invention relates to windings on a stator of an electrical machine and, in particular, to switched reluctance machines. More specifically, the invention relates to an improved method for packing the windings on stator poles and within the space between the poles.

BACKGROUND OF THE RELATED ART

A switched reluctance machine (SRM) is well known in literature and its principle, theory of operation, and construction are all described in R. Krishnan, "Switched Reluctance Motor Drives", CRC Press, 2001. An SRM have windings on its stator poles and there are no windings or magnets on the rotor poles or rotor slots. The stator windings of the SRM are wound around the individual stator teeth or poles, and they are concentric around the poles. Such concentric windings lend themselves to being wound on formers and then being inserted onto the stator poles in the manufacturing process of the SRM stator. When the number of poles become smaller, say four in the case of a two phase machine, the slot volume available for stator windings is not fully utilized.

Figure 1:
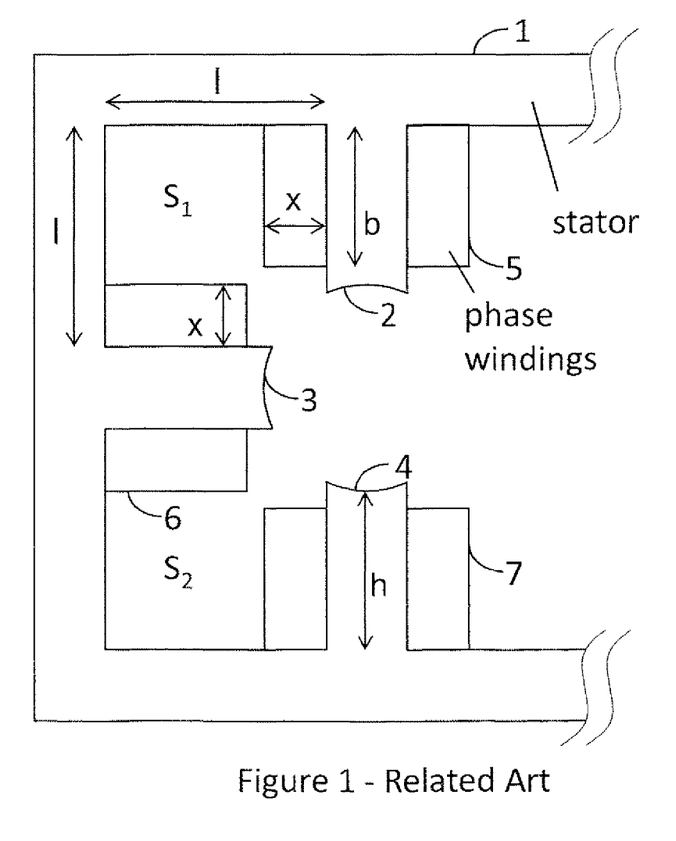
FIG. 1 illustrates a partial view of a switched reluctance machine stator.

FIG. 1 illustrates a partial view of an SRM stator with stator poles, windings on the stator poles, and volumes of space between the windings of adjacent poles. Partial stator 1 has three stator poles 2, 3 and 4; a fourth pole is not illustrated in FIG. 1. A stator winding 5 is wound around stator pole 2, a stator winding 6 is wound around stator pole 3, and a stator winding 7 is wound around stator pole 4. The rotor of the SRM is not shown in FIG. 1.

Consider a volume of space $S_1$ between stator windings 5 and 6 of stator poles 2 and 3. Volume space $S_1$ is unutilized and not filled with windings, so as to avoid mechanical and electrical interferences between windings 5 and 6. Similar reasoning applies to the unutilized volume space $S_2$ between windings 6 and 7. Likewise, there are two other volume spaces within stator 1, but not shown in the FIG. 1.

A turn of winding is defined as one turn of winding around a pole and, therefore, will have two sides on each side of the stator pole. Multiple turns per pole constitute a coil or part of the phase winding. Depending on the number of poles and phases, the multiple turns may be interconnected. The SRM shown in FIG. 1 is assumed to have four stator poles and two rotor poles and has two phase windings. The windings on poles 2 and 4 are connected in series so that, together, they constitute one phase winding, Phase A. Similarly, the windings on pole 3 and its diametrically opposite stator pole (not shown in FIG. 1) are connected to form a Phase B winding. Windings 5, 6 and 7 are usually wound on the former and inserted on machine poles 2, 3 and 4, respectively, as is done for all poles and windings of the SRM. Machine-based automated winding of SRM windings may be resorted to.

The winding volume and area are constrained for a number of reasons. The windings in FIG. 1, say 5 and 6, for example, have to be identical for ease of manufacture. Therefore, their dimensions are identical and if one is bigger than the other in linear dimensions, the area and volume of the windings change, with the result that the windings will interfere with each other mechanically during insertion, given the fixed volume space between the two adjacent poles. Further the larger size can complicate an electrical insulation problem if the windings happen to overlap each other, since they will be at different voltages during their operational use, resulting in failure and short circuiting of the windings. The space that is unutilized, after accounting for the mechanical clearance between poles 2 and 3, is shown as $S_1$ in FIG. 1. Space $S_2$ between poles 3 and 4 is also unutilized. The discussion herein will focus on space $S_1$, and similar and identical reasoning can be applied to all other spaces, including space $S_2$.

Another constraint for the volume of stator windings arises from the shape of the stator. The stator may be shaped like a circle, an octagonal, or in between a square and a circle, making the area in between the stator poles not a regular surface, such as a rectangle. Such surface areas are hard to deal with for placing the windings, because of the crevice spaces and areas that have to be left out of the winding area.

The above-discussed constraints are the most severe within the conventional packing and arrangement of windings in an SRM. The conventional method of packing the windings is illustrated in FIG. 1, with a large unutilized area for winding as shown by areas $S_1$ and $S_2$.

The problem of manual insertion of the windings creates interference between adjacent windings, for example, between windings 5 and 6 in volume space $S_1$. Waste of space volume in between the windings leads to many undesirable effects, such as: (1) a lower number of turns packed per pole winding, resulting in lower magneto motive force (mmf) for an operating current that leads to lower flux density and flux in the stator poles and in the output torque of the SRM, (2) a higher resistance per phase for a desired number of turns resulting from making the cross sectional area of the winding conductor accommodate more turns within the winding space volume, which results in higher resistive losses and lower efficiency in the operation of a machine, and (3) the power output of the SRM is lower than optimal both liar steady state and peak power operation, because of the lower number of turns per phase and higher resistance per phase.

SUMMARY OF THE INVENTION

An object of the invention is to overcome the above-mentioned limitations of the prior art.

To achieve this and other objects of the invention, a switched reluctance motor includes at least four stator poles and an electrically conductive material around each of the stator poles. The geometric outline, on one side of the stator pole, of at least one of the conductive materials is not rectangular, as viewed from a cross-section of the switched reluctance motor showing each of the stator poles. The geometric outline may be triangular, the shape of the letter "L," a rectangle with a portion of the rectangle absent, or a triangle with a portion of the triangle absent. The absent portions may be rectangular or triangular.

In accordance with the exemplary embodiment of the present invention a switched reluctance machine (SRM) is provided that comprises a stator having plurality of poles, each of which has its concentric windings connected in a manner that achieves a required number of machine phases, and a rotor having a plurality of poles with neither windings nor magnets on the rotor poles. The space volume between the stator poles is filled with a maximum number of winding turns so as to have maximum number of turns per phase winding in the SRM, so as to obtain the maximum torque and power output of the SRM as well as to increase its operational efficiency. The space volume between the pole windings is

DETAILED DESCRIPTION OF THE INVENTION

Figure 2:
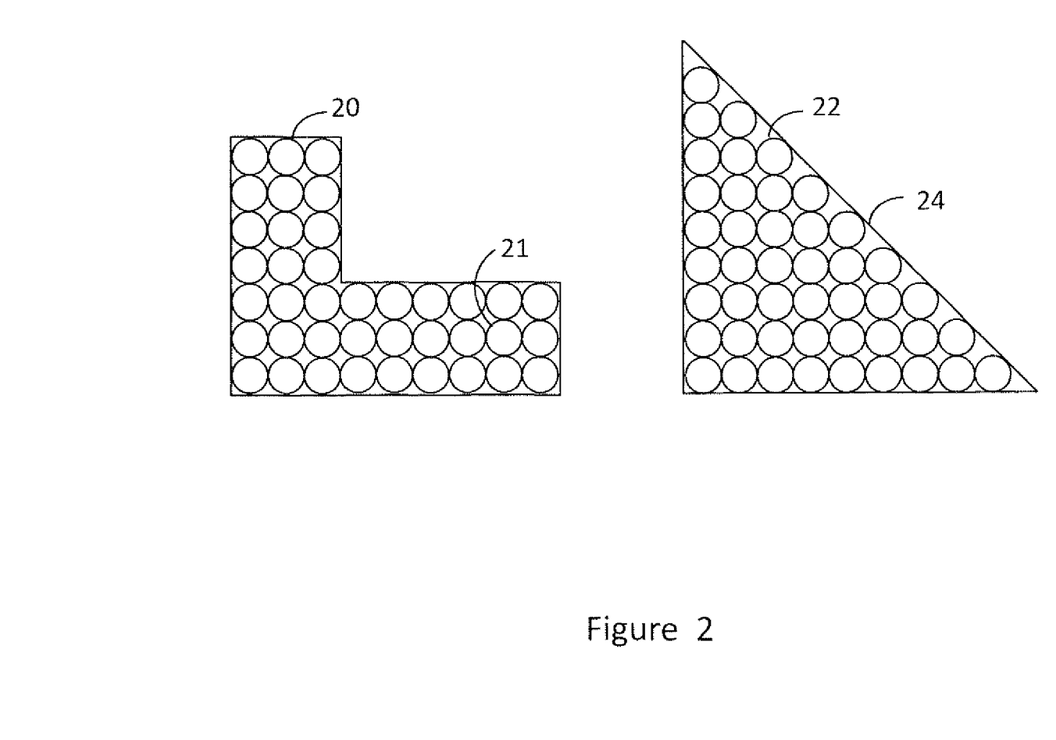
FIG. 2 illustrates two winding forms and shapes around stator poles.

The highest utilization of the space area for the pole windings has to be achieved under the constraints that each pole winding has to be similar to the other ones in the SRM. Simply stated, the diametrically opposite pole sets must have the same dimensions. Such uniform constraints make for simpler construction and lower cost of manufacture. FIG. 2 illustrates a winding 20 having an L shape and another winding 24 that is triangular, with each one representing the part of the coil on one side of the pole winding. Because they each constitute a coil side of the pole winding, the pole windings will have two of them side by side for placement on the stator poles, with interconnection for each of the individual conductors 21 and 22 that populate the coil sides.

The number of turns per pole winding is determined by the area of the coil sides given by the prescribed shapes divided by the individual conductor's cross-sectional area, which should include the electrical insulation on the conductor and interstice area that is lost between the conductors per conductor in the packaging of the coils within the shapes. In general, the total number of turns per pole winding can be computed by the area of the coil shape divided by the product of the cross-sectional area of the wire used for making the winding and a fill-in or packing factor. The packing factor can range anywhere from 0.4 to 0.8 in industrial and commercial applications.

Figure 3:
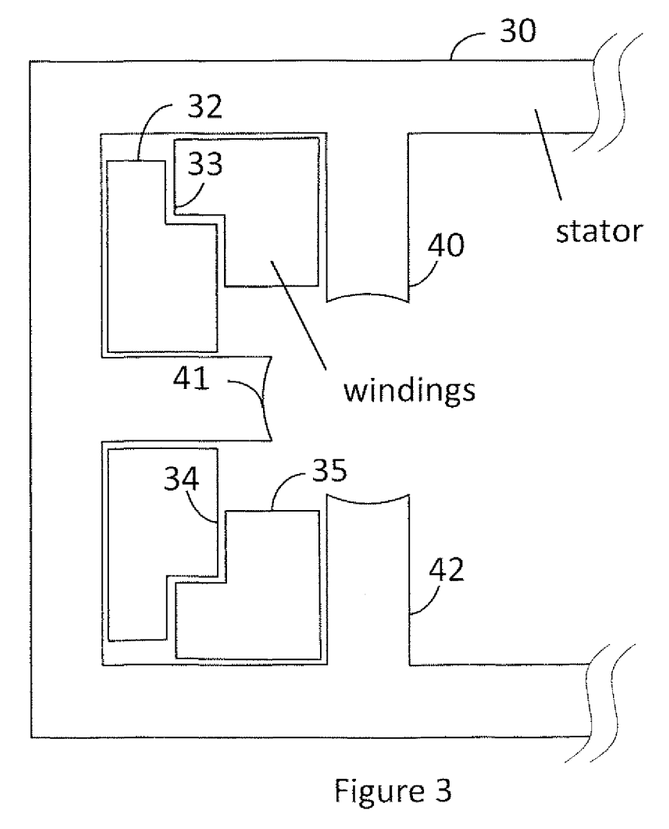
FIG. 3 illustrates L-shaped winding forms for stator poles.

An exemplary embodiment of the invention is shown in FIG. 3 in relation to the partial view of a stator 30. The illustrated stator poles 4-42 have two different types of L shaped coil sides placed on adjacent poles and populated with individual conductors. Pole 40's coil side 33 and pole 41's coil side 32 have different linear dimensions but have equal area so that they contain the same number of conductors. They are made to be dimensionally different so that they can be accommodated with the maximum amount of area between the poles being utilized for placement of conductors. Note that coil sides 32 and 34 are of the same linear dimensions and are equal in area since they form the two coil sides of the pole windings. Coil sides 33 and 35 similarly have the same dimensions and area. To maintain symmetry for ease of manufacture, the diametrically opposite poles 40 and 42 are equipped with the same form of coil sides and likewise the other diametrically opposite pair of stator poles with the other form of coil sides. That necessitates two different sets of coil sides and their insertions in the manufacturing process that can be handled with low cost and effort.

Figure 4:
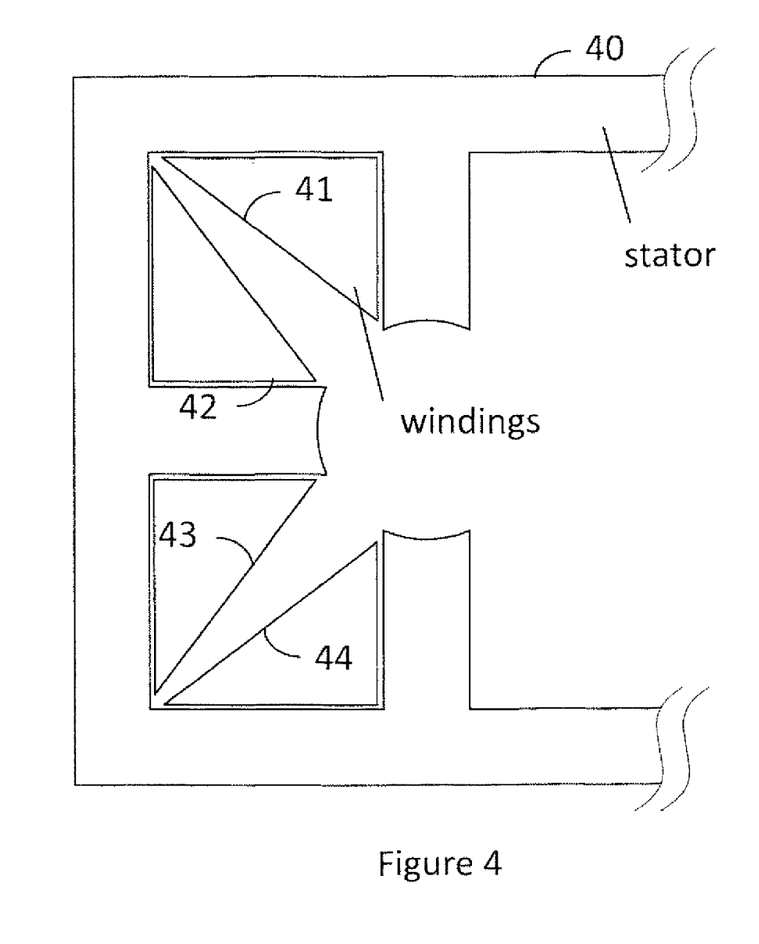
FIG. 4 illustrates triangular-shaped winding forms.

FIG. 4 shows another exemplary embodiment of the invention with a partial stator 40 where the coil sides 41-44 take the form of triangular package and they are symmetrical for all the pole windings. The symmetry in construction of the coils and their placement on the stator poles makes for low effort and low-level-instruction-based and repetitive manufacturing operation, resulting in low cost and high reliability in the manufacture. The pole windings are wound on the stator poles guiding the conductors around a former with the shape of the coil sides 41-44 on all the poles of the stator. The interconnection between the diametrically opposite pole windings to form the final phase windings is made either manually or in an automated manner.

Figure 5:
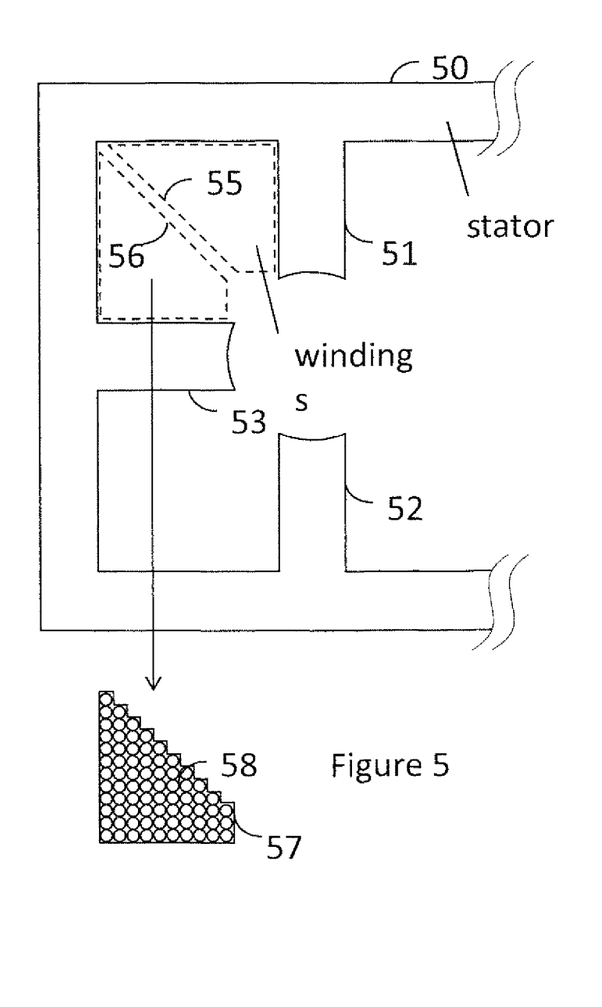
FIG. 5 illustrates quasi triangular and quasi L-shaped winding forms.

Another exemplary embodiment is shown in FIG. 5 with a partial stator 50. Here the shape of a winding 57 is neither a strict L nor a triangle, but a combination of both that is populated with individual conductor wires 58 to obtain maximum utilization of the area between the poles for winding placement. Coil sides 55 and 56 are symmetric and identical to coil side 57 and occupy the space between two adjacent poles 51 and 53, respectively. Similar coil sides 55 and 56 would occupy the space between adjacent poles 52 and 53.

Clearance between coil sides 55 and 56 is given so that there is no mechanical or electrical interference between the pole windings, and the clearance is determined by various factors including the operating voltage of the machine, cooling medium in the machine, humidity, and ambient temperature in which the machine is designed to operated, among other factors. The clearances are given between facing coil sides 55 and 56 and between them and the inner corner of the stator lamination as well as a clearance between them and the tip of the stator poles. All these clearances also allow for flow of fluid or air for effective heat transfer and cooling of the windings. These clearances between the coils and between them and the body of the stator laminations are critical for effective thermal management and applicable regardless of the coils shapes adopted for the winding.

The coil sides and hence the pole windings can be held in place with the stator by (1) plastic ties, twister ties, or wire wraps and (2) dipping the stator part of the poles and windings in encapsulating materials that are electrically and magnetically inert and baking them in an oven until they become a single mass. The latter approach gives better heat transfer from the windings to the stator iron of the machine, resulting in high power density of the machine.

A comparison of the utilization of area for the stator of FIG. 5 and that of FIG. 1 is provided below on rigorous mathematical grounds. Consider the method of packing a winding shown in FIG. 1. Let: (1) l be the distance from one end of the stator pole to the nearest corner of the inner part of the stator lamination, (2) h be the height of the stator pole, (3) b be the height of the coil on the pole winding, and (4) x be the thickness of the pole winding. The area $w_c$ for pole windings within FIG. 2 is:

$$w_c = bx \tag{1}$$

Figure 6:
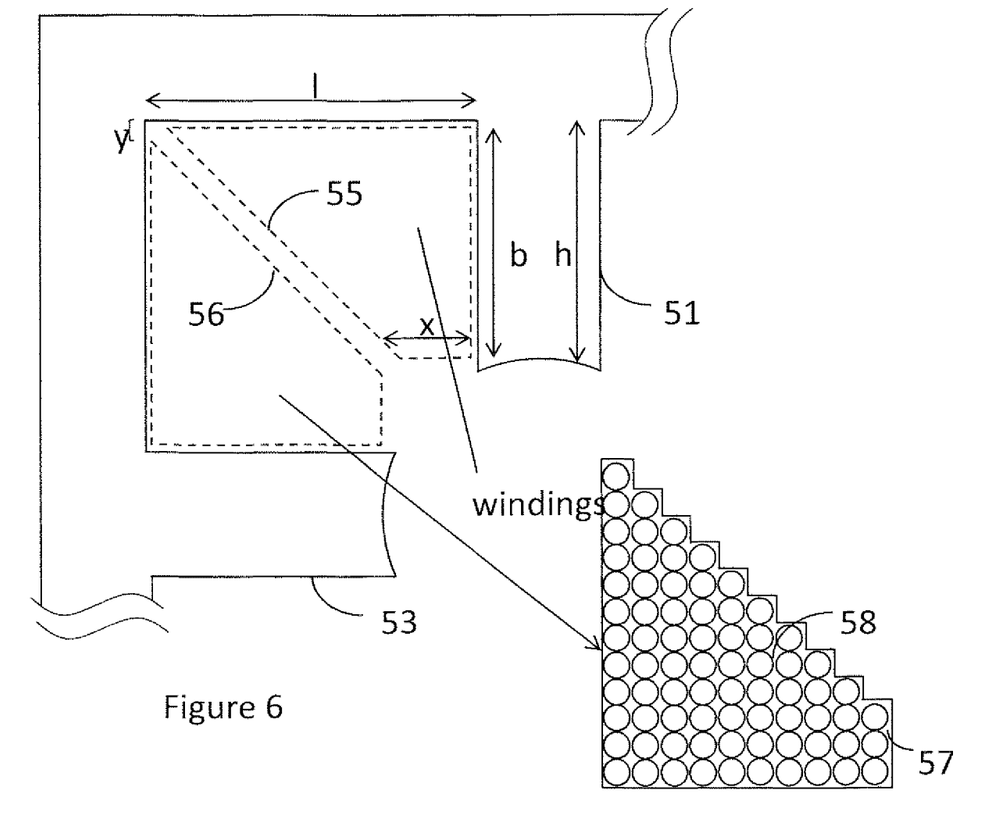
FIG. 6 illustrates dimensions of the windings of FIG. 5.

Consider now the windings illustrated in FIGS. 5 and 6 having a quasi-L and triangle-shaped coil. Let y be the clearance between the top of the inside of the stator to the coil side, and the remaining dimensions are the same as discussed in connection with FIG. 1. The winding area $w_{kr}$ for the pole windings after taking out the area for clearances between windings is:

$$xb + (l-x-y)\frac{b}{2} = w_{kr} \quad (2)$$

Therefore, the increase in winding area for the winding of FIGS. 5 and 6 as to compared to that of FIG. 1 is calculated by dividing equation (2) by equation (1):

$$\frac{w_{kr}}{w_c} = \frac{bx + (l-x-y)b/2}{bx} = 1 + \frac{(l-x-y)}{2x} = 1 + \frac{1}{2}\left[\frac{l}{x} - \frac{y}{x} - 1\right] \quad (3)$$

Length l is always greater than x, and length y is less than x. Thus:

$$\left(\frac{l}{x} - \frac{y}{x} - 1\right) > 0 \quad (4)$$

This leads to the conclusion that the ratio between the respective winding areas of FIG. 6 and FIG. 1 is more than one and will be determined by the lengths l, y and x. The gain in winding area $\Delta w_a$ of FIG. 6 with respect to that of FIG. 1 is derived as:

$$\Delta w_a = \frac{w_{kr}}{w_c} - 1 = \frac{1}{2}\left[\frac{l}{x} - \frac{y}{x} - 1\right] \quad (5)$$

Figure 7:
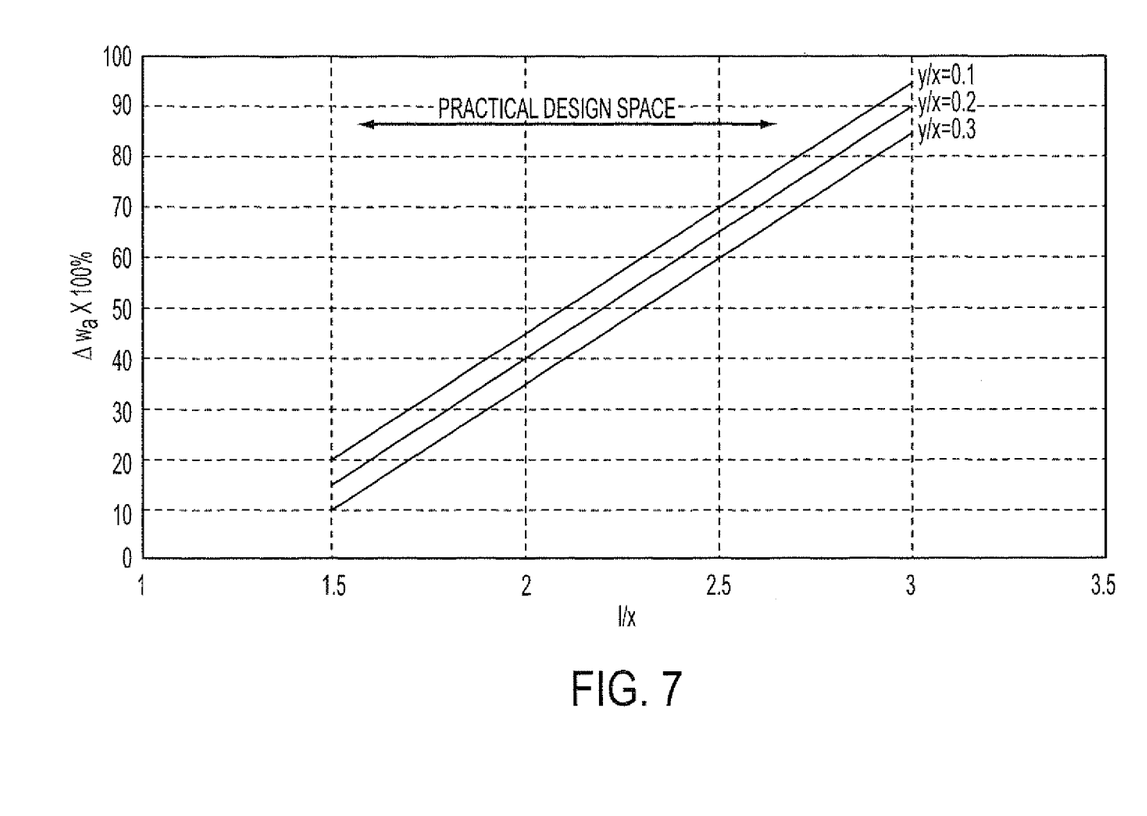
FIG. 7 illustrates the gain in winding area as a function of linear dimensions and clearances.

FIG. 7 illustrates the percent gain in winding area $\Delta w_a$ versus l/x for values ranging from 1 to 3.5 as a function of y/x ranging in values from 0.1 to 0.3. Practical design space is in the vicinity of 1.5 to 2.5 for parameter l/x and it is used to illustrate the winding gain. Values of winding gains are considerably higher for the winding of FIG. 6 even for conservative parameter variations of l/x and y/x. The winding gain, on a conservative basis, is in the range of 10 to 70%.

Embodiments of the invention exist for various outer and inner shapes of the stator laminations such as circular, octagonal, hexagonal, and square or a combination of some or many of these lamination shapes. Similar embodiments can be made by varying the shapes of the coil sides to circular or a combination of various regular shapes and irregular shapes. The rotor and stator pole numbers and machine phases can be varied with the invention. The invention is equally applicable to all machines, such as permanent magnet brushless dc machine and permanent magnet synchronous machine, in so far they use concentric coils in their windings.

What is claimed is:

1. A switched reluctance motor comprising:
   four stator poles; and
   an electrically conductive material around each of the stator poles, wherein:
   for one of the conductive materials on one side of one of the stator poles, as viewed from a cross-section of the switched reluctance motor showing each of the stator poles;
   the geometric outline is a rectangle with a rectangular portion of the rectangle absent,
   both dimensions of the absent rectangular portion are smaller than both dimensions of the rectangle,
   each dimension of the absent rectangular portion is parallel to a dimension of the rectangle, and
   portions of two of the rectangles four edges constitute two edges of the absent rectangular portion.

2. The switched reluctance motor of claim 1, wherein the geometric outline is the shape of the letter "L."

* * * * *